(12) United States Patent
Park et al.

(10) Patent No.: US 10,124,695 B2
(45) Date of Patent: Nov. 13, 2018

(54) METHOD AND DEVICE FOR CONTROLLING OUTPUT OF LOW VOLTAGE DC-DC CONVERTER IN ENVIRONMENTALLY FRIENDLY VEHICLE

(71) Applicants: Hyundai Motor Company, Seoul (KR); Kia Motors Corporation, Seoul (KR)

(72) Inventors: Jun Yeon Park, Gyeonggi-do (KR); Youngjin Jang, Gyeongsangbuk-do (KR); Jeeheon Kim, Gyeonggi-do (KR); Hojoong Lee, Gyeonggi-do (KR); Hyun Wook Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 234 days.

(21) Appl. No.: 15/368,331

(22) Filed: Dec. 2, 2016

(65) Prior Publication Data

US 2018/0056807 A1 Mar. 1, 2018

(30) Foreign Application Priority Data

Aug. 23, 2016 (KR) ........................ 10-2016-0107052

(51) Int. Cl.
*G06F 19/00* (2018.01)
*B60L 11/18* (2006.01)
(Continued)

(52) U.S. Cl.
CPC ............. *B60L 11/1864* (2013.01); *B60L 7/16* (2013.01); *B60L 11/1861* (2013.01);
(Continued)

(58) Field of Classification Search
CPC .... B60L 11/1864; B60L 7/16; B60L 11/1861; B60L 2210/10; B60W 20/00; Y10S 903/907
(Continued)

(56) References Cited

U.S. PATENT DOCUMENTS

| | | | |
|---|---|---|---|
| 2004/0090195 A1* | 5/2004 | Motsenbocker | ........ B63B 43/18 318/109 |
| 2005/0003925 A1* | 1/2005 | Wakashiro | ............. B60K 6/485 477/2 |

(Continued)

*Primary Examiner* — Ronnie M Mancho
(74) *Attorney, Agent, or Firm* — Mintz Levin Cohn Ferris Glovksy and Popeo, P.C.

(57) ABSTRACT

A method for controlling an output of an LDC in an environmentally friendly vehicle is provided. The method includes determining whether the vehicle travels in the regenerative braking mode and when the vehicle does, transmitting a first slope signal to the LDC to increase an output voltage of the LDC that charges or discharges an auxiliary battery supplying power to an electric load using a high voltage battery. The first slope signal determines an upward slope of the output voltage of the LDC according to time as a first slope. When the vehicle does not travel in the regenerative braking mode and uses a high power electric load a second slope signal is transmitted to the LDC to increase the output voltage of the LDC. The second slope signal determines the upward slope as the second slope having a slope less than the first slope.

14 Claims, 5 Drawing Sheets

(51) Int. Cl.
  *B60W 20/00* (2016.01)
  *B60L 7/16* (2006.01)
(52) U.S. Cl.
  CPC .......... *B60W 20/00* (2013.01); *B60L 2210/10* (2013.01); *Y10S 903/907* (2013.01)
(58) Field of Classification Search
  USPC .......................................................... 701/22
  See application file for complete search history.

(56) References Cited

U.S. PATENT DOCUMENTS

| | | | | |
|---|---|---|---|---|
| 2006/0005738 | A1* | 1/2006 | Kumar | B60L 7/06 |
| | | | | 105/35 |
| 2010/0010697 | A1* | 1/2010 | Soma | B60K 6/445 |
| | | | | 701/22 |
| 2010/0204861 | A1* | 8/2010 | Kaita | B60L 11/1851 |
| | | | | 701/22 |
| 2015/0224845 | A1* | 8/2015 | Anderson | B60G 17/019 |
| | | | | 701/37 |
| 2016/0045841 | A1* | 2/2016 | Kaplan | B01J 19/0093 |
| | | | | 429/49 |
| 2016/0257294 | A1* | 9/2016 | Morisaki | B60W 20/12 |
| 2016/0355189 | A1* | 12/2016 | Lin | B60W 40/13 |

* cited by examiner

METHOD AND DEVICE FOR CONTROLLING OUTPUT OF LOW VOLTAGE DC-DC CONVERTER IN ENVIRONMENTALLY FRIENDLY VEHICLE

CROSS-REFERENCE TO RELATED APPLICATION

This application claims priority to and the benefit of Korean Patent Application No. 10-2016-0107052 filed in the Korean Intellectual Property Office on Aug. 23, 2016, the entire contents of which are incorporated herein by reference.

BACKGROUND

(a) Field of the Invention

The present invention relates to an environmentally friendly vehicle, and more particularly, to a method and a device for controlling an output of a low voltage direct current-direct current (DC-DC) converter in an environmentally friendly vehicle.

(b) Description of the Related Art

In general, an electric vehicle (EV) and a hybrid electric vehicle (HEV) which are types of environmentally friendly vehicles are operated by a motor by a battery power supply. Since the environmentally friendly vehicle is operated even by the motor, a high-voltage large-capacity battery (e.g., a main battery) and a low voltage DC-DC converter (LDC) that charges an auxiliary battery, such as an alternator converting voltage of the main battery into low voltage, are mounted within the environmentally friendly vehicle. Herein, the auxiliary battery generally indicates a vehicle battery configured to supply power for ignition and to various electrical devices of a vehicle.

Further, the LDC is configured to supply the power to adjust the voltage of the main battery to be suitable for voltage used for an electric/electronic load of the vehicle. In general, the hybrid vehicle is a type of vehicle driven by efficiently combining two or more different power sources, but in most cases, the hybrid vehicle acquires drive force by an engine using a fuel and an electric motor driven by power of a battery, which is called a hybrid electric vehicle (HEV).

In recent years, research regarding the hybrid electric vehicle has been in active progress in response to the demand for enhancing fuel efficiency and developing a more environmentally friendly product. The hybrid electric vehicle may have various structures using the engine and the electric motor as the power sources, and as many vehicles that have been researched recently, a parallel type and a serial type have been used. Particularly, in the parallel type, the engine charges the battery, but directly drives the vehicle together with the electric motor, and the parallel type has an disadvantage in that it is more complex in terms of a structure and in terms of a control logic. However, the parallel type is widely adopted in a vehicle due to an advantage of efficiently using energy due to mechanical energy of the engine and electrical energy of the battery may be used simultaneously.

Since optimal operating areas of the engine and the electric motor are used, fuel efficiency of the drive system is improved, and since the energy is recovered by the electric motor while braking, the energy may be used efficiently. In addition, a hybrid control unit (HCU) is installed within the hybrid vehicle, and each apparatus constituting the system includes a controller. For example, the system includes an engine control unit (ECU) configured to operate the engine, a motor control unit (MCU) configured to operate the electric motor, a transmission control unit (TCU) configured to operate a transmission, a battery management system (BMS) configured to monitor and manage a state of the battery, and a full auto temperature controller (FATC) configured to adjust a temperature in the vehicle.

Herein, the HCU is an uppermost controller configured to operate each of the controllers, set a hybrid operation mode, and operate the vehicle, and the respective controllers are connected via a controller area network (CAN) communication line based on the HCU which is the uppermost controller to allow the upper controller to transfer a command to a lower controller while the controllers transmit and receive information to and from each other.

Further, a high-voltage battery (e.g., main battery) configured to provide driving power of the electric motor is mounted within the hybrid vehicle, and the high-voltage battery is configured to supply required power while repeating charge or discharge while the vehicle is driven. In motor assist, the high-voltage battery is configured to supply (e.g., discharges) the electric energy and store (e.g., charges) the electric energy in regenerative braking or engine driving, and in this case, the BMS is configured to transmit a state of charge (SOC), available charged power, and available discharged power of the battery to the HCU and the MCU to perform battery safety and life-span management. In addition, an auxiliary battery (e.g., low-voltage battery) configured to provide driving power of an electric/electronic subassembly is installed within the hybrid vehicle together with the main battery (e.g., high-voltage battery) configured to provide the driving power of the electric motor (e.g., driving motor). The low voltage DC-DC converter (LDC) for output conversion between high voltage and low voltage is connected to the auxiliary battery.

The above information disclosed in this section is merely for enhancement of understanding of the background of the invention and therefore it may contain information that does not form the prior art that is already known in this country to a person of ordinary skill in the art.

SUMMARY

The present invention provides a method and a device for controlling an output of a low voltage direct current-direct current (DC-DC) converter (LDC) in an environmentally friendly vehicle that is capable of adjusting an output voltage of the LDC.

An exemplary embodiment of the present invention provides a method for controlling the output of the LDC in the environmentally friendly vehicle that may include: determining, by a controller, whether the environmentally friendly vehicle is traveling in the regenerative braking mode; in response to determining that the environmentally friendly vehicle is traveling in a regenerative braking mode, transmitting, by the controller, a first slope signal to the LDC to increase an output voltage of the LDC that charges or discharges an auxiliary battery configured to supply power to an electric load using a high voltage battery used for driving the environmentally-friendly vehicle, wherein the first slope signal determines an upward slope of the output voltage of the LDC based on time as a first slope; and in response to determining that the environmentally friendly vehicle is not traveling in the regenerative braking mode and uses a high power electric load included in the electric load, transmitting, by the controller, a second slope signal to the LDC to increase the output voltage of the LDC, wherein the second slope signal determines the upward slope as the second slope having a slope that is less than the first slope.

The method for controlling the output of the LDC may further include: determining, by the controller, whether a state of charge (SOC) of the auxiliary battery exceeds a first threshold value. Additionally, the controller may be configured to transmit the first slope signal to the LDC when the SOC of the auxiliary battery exceeds the first threshold value, and transmit the second slope signal to the LDC when the SOC of the auxiliary battery is less than the first threshold value.

Further, the method may further: determining, by the controller, whether a current flowing through the electric load is less than a second threshold value. The controller may be configured to transmit the first slope signal to the LDC when the current of the electric load is less than the second threshold value, and transmit the second slope signal to the LDC when the current of the electric load is greater than the second threshold value.

The method may further include: determining, by the controller, whether a voltage difference between a first voltage of the auxiliary battery measured at a first particular time and a second voltage of the auxiliary battery measured at a second particular time after an elapsed time is not zero. The controller may be configured to transmit the first slope signal to the LDC when the voltage difference between the first voltage and the second voltage is greater than zero, and transmit the second slope signal to the LDC when the voltage difference is zero.

In addition, the method may include: determining, by the controller, whether a current flowing in the auxiliary battery is less than a third threshold value. The controller may be configured to maintain the output voltage of the LDC increased according to the transmitted first slope signal when the current of the auxiliary battery is less than the third threshold value, and transmit the second slope signal to the LDC when the current of the auxiliary battery is greater than the third threshold value.

The method for controlling the output of the LDC may further include: in response to determine that the environmentally friendly vehicle is not traveling in the regenerative braking mode, transmitting, by the controller, a third slope signal to the LDC to reduce the output voltage of the LDC, wherein the third slope signal determines a downward slope of the output voltage of the LDC according to time as a third slope greater than the downward slope corresponding to the second slope. In response to determining that the environmentally friendly vehicle is not traveling in the regenerative braking mode the controller may be configured to transmit a slope signal to the LDC to reduce the output voltage of the LDC, wherein the slope signal determines a downward slope of the output voltage of the LDC according to time as a negative slope that corresponds to the second slope.

An exemplary embodiment of the present invention may provide the device for controlling the output of the LDC in the environmentally friendly vehicle that may include: an auxiliary battery configured to supply power to an electric load using a high voltage battery used for driving the environmentally-friendly vehicle; and a controller configured to transmit a first slope signal to the LDC to increase an output voltage of the LDC when the environmentally friendly vehicle travels in a regenerative braking mode, wherein the first slope signal determines an upward slope of the output voltage of the LDC according to time as a first slope and wherein the LDC is configured to charge or discharge the auxiliary battery. When the environmentally friendly vehicle is not traveling in the regenerative braking mode and uses a high power electric load included in the electric load, the controller may be configured to transmit a second slope signal to the LDC to increase the output voltage of the LDC, and the second slope signal may determine the upward slope as the second slope having a slope less than the first slope.

The controller may be configured to transmit the first slope signal to the LDC when a state of charge (SOC) of the auxiliary battery exceeds the first threshold value, and the controller may be configured to transmit the second slope signal to the LDC when the SOC of the auxiliary battery is less than the first threshold value. Additionally, the controller may be configured to transmit the first slope signal to the LDC when a current of the electric load is less than a second threshold value, and transmit the second slope signal to the LDC when the current of the electric load is greater than the second threshold value.

The controller may further be configured to transmit the first slope signal to the LDC when a voltage difference between a first voltage of the auxiliary battery measured at a first particular time and a second voltage of the auxiliary battery measured at a second particular time after an elapsed time is not zero. The controller may also be configured to transmit the second slope signal to the LDC when the voltage difference is zero. The controller may be configured to maintain the output voltage of the LDC increased according to the transmitted first slope signal when a current of the auxiliary battery is less than a third threshold value, and transmit the second slope signal to the LDC when the current of the auxiliary battery is greater than the third threshold value.

When the environmentally friendly vehicle is not traveling in the regenerative braking mode, the controller may be configured to transmit a third slope signal to the LDC to reduce the output voltage of the LDC, and the third slope signal may determine a downward slope of the output voltage of the LDC according to time as a third slope greater than the downward slope corresponding to the second slope. When the environmentally friendly vehicle is not traveling in the regenerative braking mode, the controller may be configured to transmit a slope signal to the LDC to reduce the output voltage of the LDC, and the slope signal may determine a downward slope of the output voltage of the LDC according to time as a negative slope corresponding to the second slope.

The method and the device for controlling the output of the LDC in the environmentally friendly vehicle according to an exemplary embodiment of the present invention may change a slope of an output voltage command for the LDC based on a driving mode of the vehicle and whether the high power electric load (or a high power electric/electronic load) is used. Thus, power consumption of the LDC may be reduced and fuel efficiency of the vehicle may be improved. Further, the exemplary embodiment of the present invention may change the output voltage command slope of the LDC based on a state of an auxiliary battery, thereby improving durability of the auxiliary battery.

BRIEF DESCRIPTION OF THE DRAWINGS

A brief description of the drawings will be provided to more sufficiently understand the drawings which are used in the detailed description of the present invention.

DETAILED DESCRIPTION

Figure 1:
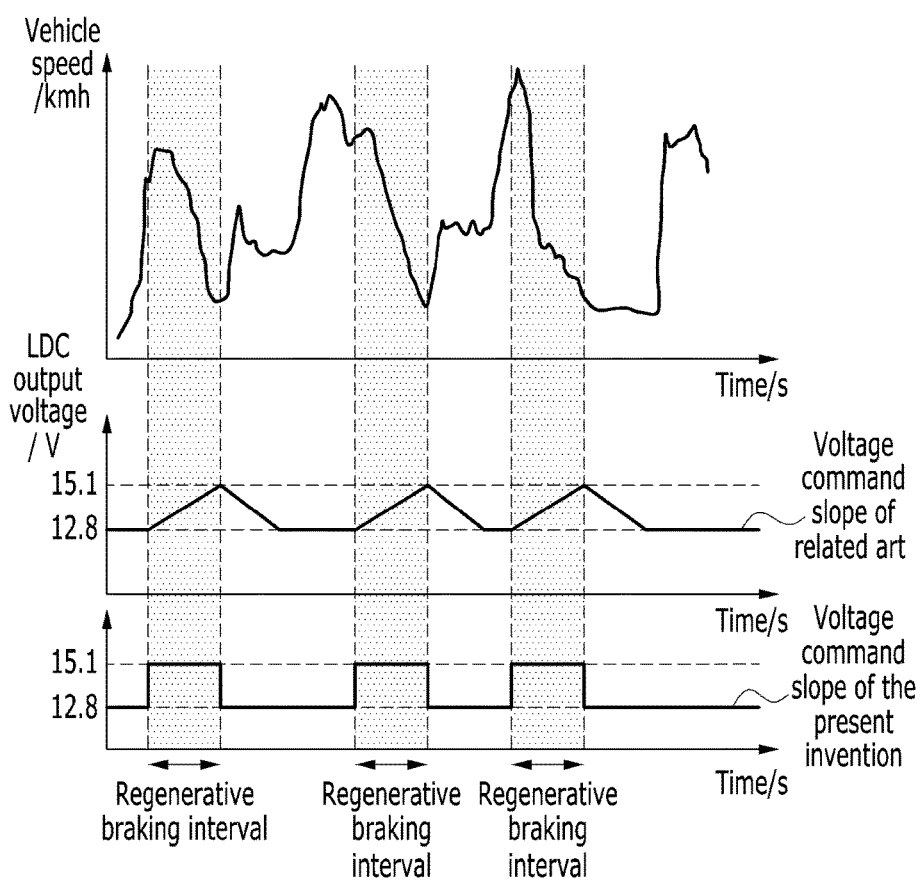
FIG. 1 is a graph illustrating an output voltage slope of a low voltage direct current-direct current (DC-DC) converter in an environmentally friendly vehicle according to an exemplary embodiment of the present invention.

In order to sufficiently understand the present invention and the object achieved by embodying the present invention, the accompanying drawings illustrating exemplary embodiments of the present invention and contents described in the accompanying drawings are to be referenced.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe specific exemplary embodiments rather than limiting the present invention. It will be understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof. Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Figure 2:
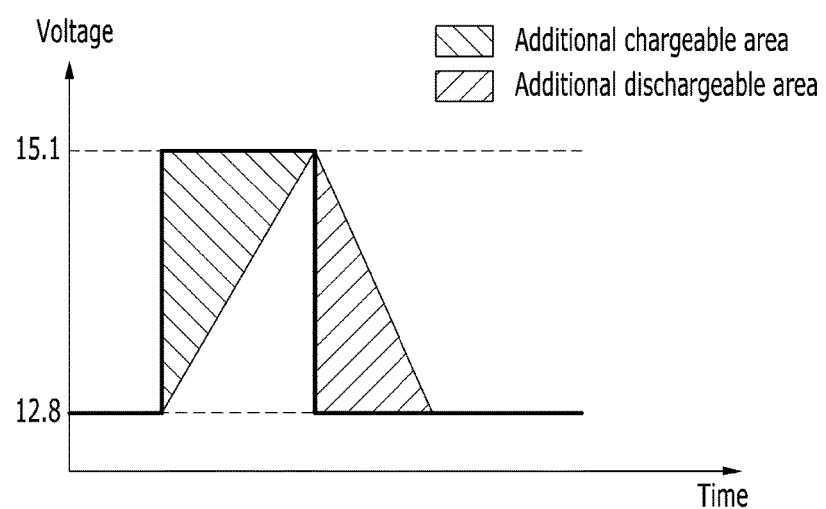
FIG. 2 is a graph illustrating a voltage command slope according to the exemplary embodiment of the present invention shown in FIG. 1.
Figure 3:
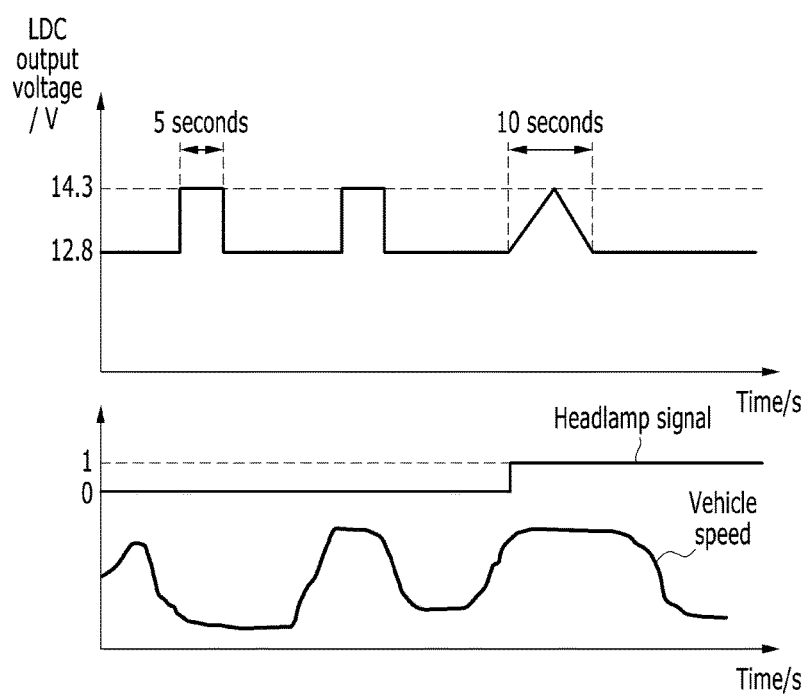
FIG. 3 is a graph illustrating an output voltage slope of a low voltage direct DC-DC converter in the environmentally friendly vehicle according to another exemplary embodiment of the present invention.
Figure 5:
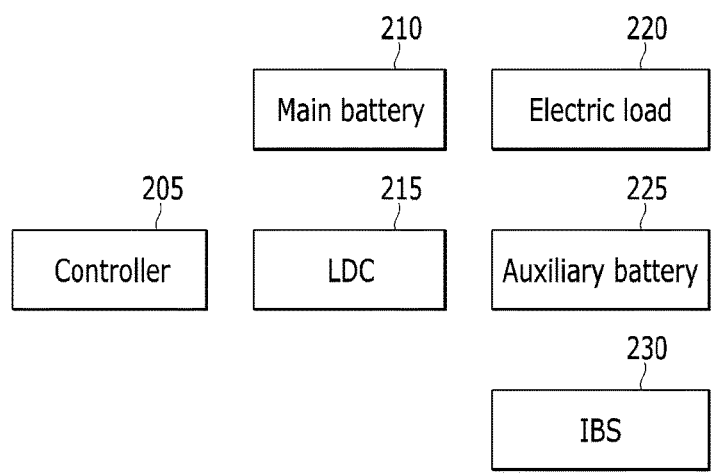
FIG. 5 is a block diagram illustrating a device for controlling an output of the low voltage DC-DC converter in the environmentally friendly vehicle according to an exemplary embodiment of the present invention.

FIG. 1 is a graph illustrating an output voltage slope of a low voltage direct current-direct current (DC-DC) converter (LDC) in an environmentally friendly vehicle according to an exemplary embodiment of the present invention. FIG. 2 is a graph illustrating a voltage command slope according to the exemplary embodiment of the present invention shown in FIG. 1. FIG. 3 is a graph illustrating an output voltage slope of a low voltage direct DC-DC converter in the environmentally friendly vehicle according to another exemplary embodiment of the present invention. FIG. 5 is a block diagram illustrating a device for controlling an output of a low voltage DC-DC converter in the environmentally friendly vehicle according to an exemplary embodiment of the present invention.

Referring to FIG. 1, FIG. 2, FIG. 3, and FIG. 5, the related art uses a same voltage command slope (e.g., 0.2 V/s) for a low voltage direct current-direct current (DC-DC) converter (LDC) when the related art increases or decreases an output voltage of the LDC or when the output voltage of the LDC is used for a high power electric/electronic load. When the exemplary embodiment of the present invention adjusts an output voltage of the LDC based on a driving condition of the vehicle (e.g., the vehicle speed or a driving mode of the vehicle), the exemplary embodiment of the present invention may change a slope of an output voltage command for the LDC.

The exemplary embodiment of the present invention may use a fact that charging efficiency of an auxiliary battery 225 is high in a regenerative braking mode of the vehicle to change the voltage command slope to a first slope (e.g., about 100 Volt/second) which is a slope for maximum charging efficiency. Thus, a charging area of the auxiliary battery 225 may be increased as shown in FIG. 2. In addition, when the regenerative braking mode of the vehicle is released, the exemplary embodiment of the present invention may rapidly reduce output power consumption of the LDC 215 by changing the voltage command slope to a third slope (e.g., about 50 V/s).

When a low state of charge (SOC) of the auxiliary battery 225 or an electric load (or an electric/electronic load) 220 of the vehicle is high, an overcurrent may occur at an output of the LDC 215 according to the exemplary embodiment of the present invention or overcharge of the auxiliary battery 225 may occur. Thus, the exemplary embodiment of the present invention may change the voltage command slope by considering a state of the auxiliary battery. When a high power electric load (or a high power electric/electronic load) such as a headlamp or an air conditioner is used, the exemplary embodiment of the present invention may not execute a headlamp dimming phenomenon or air conditioner operating noise using the voltage command slope (e.g., about 0.2 V/s) which is a second slope according to the related art, as shown in FIG. 3.

Referring to FIG. 3, the exemplary embodiment of the present invention may vary the voltage command slope for the LDC 215 according to a driving state of the vehicle. Therefore, considering the charging efficiency of the auxiliary battery 225, fuel efficiency of the vehicle may be increased. As described above, the exemplary embodiment of the present invention may relate to a variable control of the output voltage of the LDC 215 included in a hybrid vehicle (e.g., a hybrid electric vehicle) or an electric vehicle. The exemplary embodiment may use an intelligent battery sensor (IBS) 230 installed within the vehicle to measure a temperature of the auxiliary battery 225 and detect whether the electric load 220 of the vehicle is being used. Thus, the fuel efficiency of the vehicle may be improved by changing the slope of the output voltage command for the LDC 215.

The exemplary embodiment may increase a charging power of the auxiliary battery 225 when the output voltage command slope for the LDC 215 is increased and reduce output power consumption of the LDC when the output voltage command slope is reduced, thereby improving the fuel efficiency of the vehicle. However, the exemplary embodiment may execute the headlamp dimming phenomenon or the air conditioner operating noise by affecting performance of an electric or electronic part (or the electric load 220) included within the vehicle. Thus, it may be necessary to appropriately adjust the voltage command slope for the LDC 215. The slope of the output voltage command may be changed according to the driving state of the vehicle and whether the electric load of the vehicle is used to reduce charging energy of the auxiliary battery 225, output power consumption of the LDC 215, and a discharging amount of a main battery 210.

Referring to FIG. 5, the device for controlling the output of the LDC in the environmentally friendly vehicle may include a controller 205 and the LDC 215. The environmentally friendly vehicle including the device for controlling the output of the LDC may include the main battery 210, the electric load 220, the auxiliary battery 225, and the IBS 230.

Particularly, the environmentally friendly vehicle may be a hybrid electric vehicle or an electric vehicle. The hybrid electric vehicle may use an engine and a motor as a power source, an engine clutch may be disposed between the motor and the engine (e.g., a diesel engine), and the hybrid electric vehicle may thus be actuated in an electric vehicle (EV) mode in which the hybrid electric vehicle is driven by the motor while the engine clutch is opened and in a hybrid electric vehicle (HEV) mode in which the hybrid electric vehicle may be driven by both the motor and the engine while the engine clutch is closed.

The main battery 210, which is a high voltage battery, may be configured to output (discharge) a high voltage of, for example, about 144 V, or greater, and may be an energy source that drives a motor (driving motor) and the LDC 215 of the environmentally friendly vehicle. The electric load 220 may include the air conditioner, a ventilating seat, a headlamp, an audio apparatus, a heater, a wiper, or the like. The IBS 230 may be configured to sense a state of charge (SOC) of the auxiliary battery 225. Additionally, the IBS 230 may be configured to detect state information including the SOC or a state of health (SOH) of the auxiliary battery 225 to more stably supply current into the vehicle. The IBS 230 may further be configured to measure a voltage, a current, and a temperature of the auxiliary battery 225, and calculate the SOC and the SOH based on the measured voltage, current, and temperature to detect the state information of the auxiliary battery 225, and may be configured to provide the state information to refer to the state information by various controllers within the vehicle.

The auxiliary battery 225 as, for example, a 12 V battery may be a vehicle battery configured to start the environmentally friendly vehicle or supply power to the electric load 220. The LDC 215 may be configured to provide the output voltage of the LDC to the electric load 220 and the auxiliary battery 225, and may include a transformer. The LDC 215 may be connected to the driving motor via an inverter and may be disposed between the main battery 210 and the auxiliary battery 225. The LDC 215 may further be configured to convert (output) the voltage of the high voltage main battery into a low voltage (e.g., about 12.5 to 15.1 V) and provide electricity (power) to be suitable for a voltage used in the electric load 220 and the auxiliary battery 225. The LDC 215 may be configured to convert a high voltage DC voltage output from the main battery 210 of the environmentally friendly vehicle into a low voltage DC voltage to charge the auxiliary battery 225 and monitor an electric load amount of the vehicle. Discharge of the auxiliary battery 225 may occur when the output voltage of the LDC 215 is low (e.g., less than a particular voltage) and a voltage of the auxiliary battery 225 may be maintained when the output voltage of the LDC 215 is at the middle level (e.g., between 12.8 volts and 15.1 volts). When the output voltage of the LDC 215 is high, power may be supplied to the electric load 220, and the auxiliary battery 225 may be charged.

The LDC 215 may be configured to charge or discharge the auxiliary battery 225 that supplies power to the electric load 220 using the high voltage battery 210 used for driving the environmentally-friendly vehicle. The controller 205 may be configured to operate the LDC 215 and execute the overall operation of the environmentally-friendly vehicle. The controller 205 may include a hybrid controller configured to execute the entire operation of the environmentally friendly vehicle.

When the environmentally friendly vehicle travels in the regenerative braking mode, the controller 205 may be configured to transmit (provide) a first slope signal to the LDC 215 to increase the output voltage of the LDC 215. The first slope signal may determine an upward slope of the output voltage of the LDC 215 according to time (or change of time) as the first slope (e.g., about 100 V/s). For example, the output voltage of the LDC 215 may be changed from about 12.8 volts, which is a low voltage, to about 15.1 V, which is a high voltage. In the regenerative braking mode, the battery 210 may be charged by collecting braking and inertial energy during driving by braking or inertia of the vehicle through electricity generation of the motor (or the driving motor).

When the environmentally friendly vehicle is not traveling in the regenerative braking mode and uses the high power electric load included in the electric load 220, the controller 205 may be configured to transmit a second slope signal to the LDC 215 to increase the output voltage of the LDC 215. The second slope signal may determine an upward slope of the output voltage of the LDC 215 according to time as the second slope (e.g., about 20 V/s) having a slope less than the first slope. When the SOC of the auxiliary battery 225 exceeds a first threshold value (e.g., about 80%), the controller 205 may be configured to transmit the first slope signal to the LDC 215. When the SOC of the auxiliary battery 225 is less than the first threshold value, the controller 205 may be configured to transmit the second slope signal to the LDC 215.

Furthermore, when an electric current flowing through the electric load 220 is less than a second threshold value (e.g., about 60 A), the controller 205 may be configured to transmit the first slope signal to the LDC 215. When the electric current flowing through the electric load 220 is greater than a second threshold value, the controller 205 may be configured to transmit the second slope signal to the LDC 215. In addition, when a voltage difference between a first voltage of the auxiliary battery 225 measured at a first particular time and a second voltage of the auxiliary battery measured at a second particular time after a predetermined time elapses after the first particular time is not zero, the controller 205 may be configured to transmit the first slope signal to the LDC 215. When the voltage difference is zero, the controller 205 may be configured to transmit the second slope signal to the LDC 215.

When an electric current flowing through the auxiliary battery 225 is less than a third threshold value, the controller 205 may be configured to maintain the output voltage of the LDC converter 215 increased according to the transmitted first slope signal. When the electric current of the auxiliary battery 225 is greater than the third threshold value, the controller 205 may be configured to transmit the second slope signal to the LDC 215. When the environmentally friendly vehicle is not traveling in the regenerative braking mode, the controller 205 may be configured to transmit a third slope signal to the LDC 215 to reduce the output voltage of the LDC 215. The third slope signal may determine a downward slope of the output voltage of the LDC 215 according to time as the third slope (e.g., about 50 V/s) greater than the downward slope corresponding to the second slope.

Additionally, when the environmentally friendly vehicle is not traveling in the regenerative braking mode, the controller 205 may be configured to transmit a slope signal to the LDC 215 to reduce the output voltage of the LDC 215. The slope signal may determine the downward slope of the output voltage of the LDC 215 according to time as a negative slope (e.g., about −20 V/s) having the same slope value as the second slope. For example, the controller 205 may be one or more microprocessors operated by a program or hardware including the microprocessor. The program may include a series of commands for executing a method for controlling an output of the LDC in the environmentally friendly vehicle according to an exemplary embodiment of the present invention, which will be described below.

Figure 4:
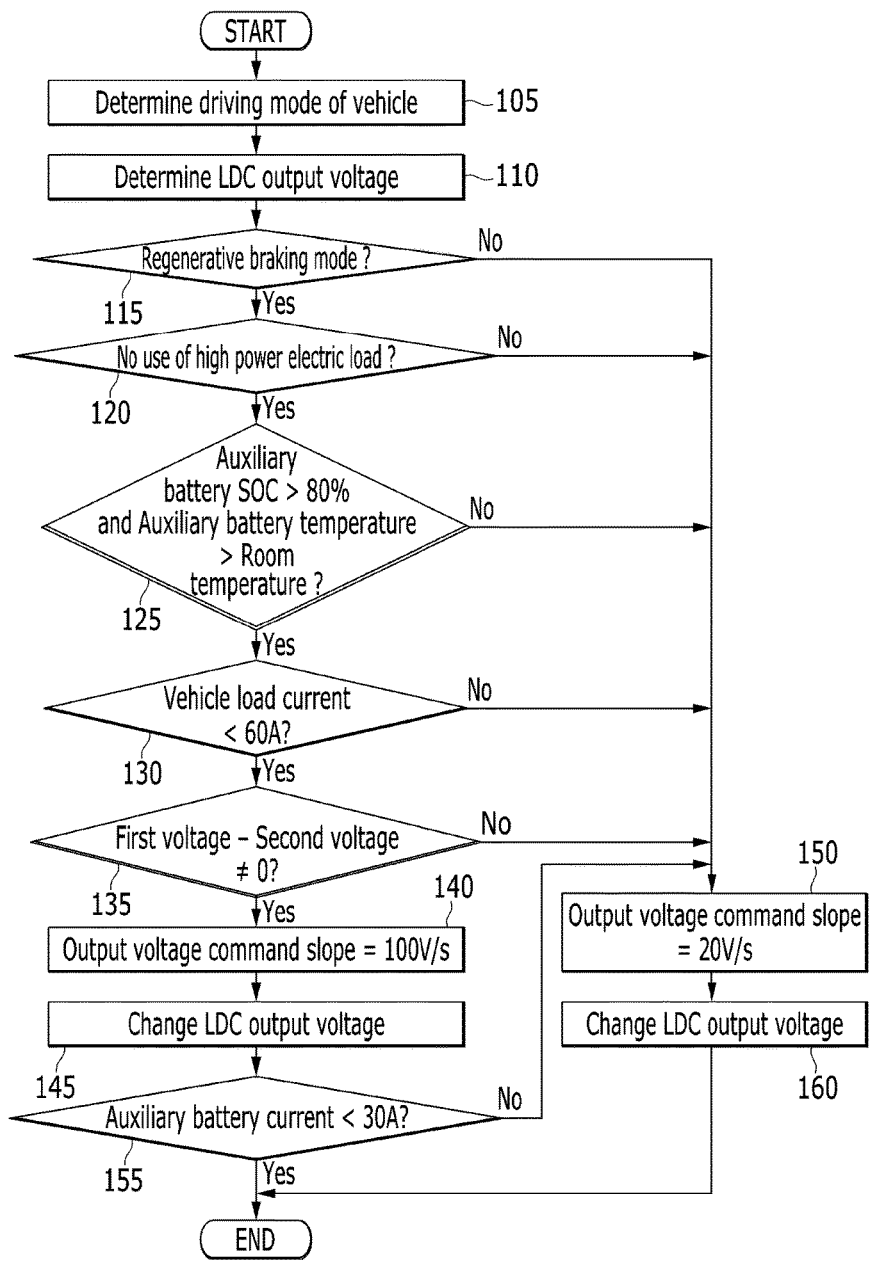
FIG. 4 is a flowchart illustrating a method for controlling an output of the low voltage DC-DC converter in the environmentally friendly vehicle according to an exemplary embodiment of the present invention.

FIG. 4 is a flowchart illustrating a method for controlling an output of the LDC in the environmentally friendly vehicle according to an exemplary embodiment of the present invention. The method for controlling the output of the LDC may be applied to the device for adjusting the output of the LDC shown in FIG. 5. Referring to FIG. 4 and FIG. 5, in a determination step 105, the controller 205 may be configured to determine the driving mode of the vehicle based on a torque required by a driver of the vehicle. The driver required torque may be detected by an acceleration pedal position sensor mounted within the environmentally friendly vehicle.

According to a determination step 110, the controller 205 may be configured to determine the output voltage of the LDC 215 that corresponds to the determined driving mode or the vehicle speed, as shown in FIG. 1 or FIG. 3. According to a determination step 115, the controller 205 may be configured to determine whether the environmentally friendly vehicle travels in the regenerative braking mode. For example, the controller 205 may be configured to determine whether the environmentally friendly vehicle travels in the regenerative braking mode based on an output signal of a brake pedal position sensor (BPS) mounted within the environmentally friendly vehicle. In response to determining that the environmentally friendly vehicle is traveling in the regenerative braking mode, the method may proceed to a determination step 120. In response to determining that the environmentally friendly vehicle is not traveling in the regenerative braking mode, the process may proceed to a setting step 150.

According to the determination step 120, the controller 205 may be configured to use an output signal of the LDC 215 to determine whether the environmentally friendly vehicle uses the high power electric load of the electric load 220. The high power electric load may use a high voltage. In response to determining that the environmentally friendly vehicle is not suing the high power electric load, the process may proceed to a comparison step 125. In addition, in response to determining that the environmentally friendly vehicle uses the high power electric load, the process may proceed to the setting step 150.

According to the comparison step 125, the controller 205 may be configured to determine whether the SOC of the auxiliary battery 225 exceeds the first threshold value (e.g., about 80%). In another exemplary embodiment of the present invention, the controller 205 may be configured to determine whether the SOC of the auxiliary battery 225 exceeds the first threshold value and the temperature of the auxiliary battery exceeds a threshold value (e.g., room temperature (about 20° C.)). The SOC of the auxiliary battery 225 and the temperature of the auxiliary battery 225 may be measured (or detected) by the IBS 230, and the measured SOC and temperature may be provided to the controller 205.

In response to determining that the SOC of the auxiliary battery 225 exceeds the first threshold value and the temperature of the auxiliary battery 225 exceeds the threshold value, the process may proceed to a comparison step 130. In addition, in response to determining that the temperature of the auxiliary battery 225 is less than the first threshold value and the temperature of the auxiliary battery 225 is less than the threshold value, the process may proceed to the setting step 150. According to the comparison step 130, the controller 205 may be configured to determine whether the current flowing through the electric load 220 is less than the second threshold value (e.g., about 60 A). In response to determining that the current flowing through the electric field load 220 is less than the second threshold value, the process may proceed to a comparison step 135. When the electric current flowing in the electric load is greater than the second threshold value, the process may proceed to the setting step 150.

According to the comparison step 135, the controller 205 may be configured to determine whether the voltage difference between the first voltage of the auxiliary battery 225 measured at the first particular time and the second voltage of the auxiliary battery measured at the second particular time after the time elapses after the first particular time is not zero. The comparison step 135 may be a step required to prevent generation of an overcurrent at the output of the LDC 215 or generation of overcharge of the auxiliary battery 225. The first voltage and the second voltage may be measured by the IBS 230, and the measured first voltage and second voltage may be provided to the controller 205.

In response to determining that the voltage difference between the first voltage of the auxiliary battery 225 measured at the first particular time and the second voltage of the auxiliary battery measured at the second particular time after the time elapses after the first particular time is not zero, the process may proceed to a setting step 140. When the voltage difference between the first voltage of the auxiliary battery 225 measured at the first particular time and the second voltage of the auxiliary battery measured at the second particular time after the time elapses after the first particular time is zero, the process may proceed to the setting step 150. According to the setting step 140, the controller 205 may be configured to determine (or set) the upward slope of the output voltage of the LDC 215 according to time as the first slope (e.g., about 100 volt/second). According to a changing step 145, the controller 205 may be configured to transmit the first slope signal that corresponds to the determined first slope to the LDC 215 to increase the output voltage of the LDC 215.

Furthermore, according to a comparison step 155, after the changing step 145, the controller 205 may be configured to determine whether the current flowing through the auxiliary battery 225 is less than the third threshold value (e.g., about 30 A). In response to determining that the current flowing through the auxiliary battery 225 is less than the third threshold value, the controller 205 may be configured to maintain the output voltage of the LDC 215 increased according to the transmitted first slope signal, and the process may be terminated. When the current flowing through the auxiliary battery 225 is greater than the third threshold value, the process may proceed to the setting step 150.

According to the setting step 150, the controller 205 may be configured to determine (or set) the upward slope of the output voltage of the LDC 215 according to time as the second slope (e.g., about 20 volt/second) having a slope less than the first slope. According to a changing step 160, the controller 205 may be configured to transmit the second slope signal that corresponds to the determined second slope to the LDC 215 to increase the output voltage of the LDC 215. In response to determining that the environmentally friendly vehicle is not traveling in the regenerative braking mode, the controller 205 may be configured to transmit the third slope signal to the LDC 215 to reduce the output voltage of the LDC 215. The third slope signal may determine the downward slope of the output voltage of the LDC 215 according to time as the third slope (e.g., about 50 V/s) greater than the downward slope that corresponds to the second slope.

In another exemplary embodiment of the present invention, in response to determining that the environmentally friendly vehicle is not traveling in the regenerative braking mode, the controller 205 may be configured to transmit the slope signal to the LDC 215 to reduce the output voltage of the LDC 215. The slope signal may determine the downward slope of the output voltage of the LDC 215 according to time as the negative slope (e.g., about −20 V/s) having the same slope value as the second slope.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a non-transitory computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

205: controller
210: main battery
215: LDC
220: electric load
225: auxiliary battery
230: IBS

What is claimed is:

1. A method for controlling an output of a low voltage direct current-direct current (DC-DC) converter (LDC) in an environmentally friendly vehicle, comprising:
   determining, by a controller, whether the environmentally friendly vehicle is traveling in the regenerative braking mode;
   in response to determining that the environmentally friendly vehicle is traveling in a regenerative braking mode, transmitting, by the controller, a first slope signal to the LDC to increase an output voltage of the LDC configured to charge and discharge an auxiliary battery which supplies power to an electric load using a high voltage battery used for driving the environmentally-friendly vehicle, wherein the first slope signal determines an upward slope of the output voltage of the LDC according to time as a first slope; and in response to determining that the environmentally friendly vehicle is not traveling in the regenerative braking mode and uses a high power electric load included in the electric load, transmitting, by the controller, a second slope signal to the LDC to increase the output voltage of the LDC, wherein the second slope signal determines the upward slope as the second slope having a slope less than the first slope.

2. The method of claim 1, further comprising:
determining, by the controller, whether a state of charge (SOC) of the auxiliary battery exceeds a first threshold value;
transmitting, by the controller, the first slope signal to the LDC when the SOC of the auxiliary battery exceeds the first threshold value; and
transmitting, by the controller, the second slope signal to the LDC when the SOC of the auxiliary battery is less than the first threshold value.

3. The method of claim 1, further comprising:
determining, by the controller, whether a current flowing through the electric load is less than a second threshold value;
transmitting, by the controller, the first slope signal to the LDC when the current of the electric load is less than the second threshold value; and
transmitting, by the controller, the second slope signal to the LDC when the current of the electric load is greater than the second threshold value.

4. The method of claim 1, further comprising:
determining, by the controller, whether a voltage difference between a first voltage of the auxiliary battery measured at a first particular time and a second voltage of the auxiliary battery measured at a second particular time after a predetermined time elapses after the first particular time is not zero;
transmitting, by the controller, the first slope signal to the LDC when the voltage difference between the first voltage and the second voltage is not zero; and
transmitting, by the controller, the second slope signal to the LDC when the voltage difference is zero.

5. The method of claim 1, further comprising:
determining, by the controller, whether a current flowing in the auxiliary battery is less than a third threshold value;
maintaining, by the controller, the output voltage of the LDC increased according to the transmitted first slope signal when the current of the auxiliary battery is less than the third threshold value; and
transmitting, by the controller, the second slope signal to the LDC when the current of the auxiliary battery is greater than the third threshold value.

6. The method of claim 1, further comprising:
in response to determining that the environmentally friendly vehicle is not traveling in the regenerative braking mode, transmitting, by the controller, a third slope signal to the LDC to reduce the output voltage of the LDC,
wherein the third slope signal determines a downward slope of the output voltage of the LDC according to time as a third slope greater than the downward slope corresponding to the second slope.

7. The method of claim 1, further comprising:
in response to determining that the environmentally friendly vehicle is not traveling in the regenerative braking mode, transmitting, by the controller, a slope signal to the LDC to reduce the output voltage of the LDC,
wherein the slope signal determines a downward slope of the output voltage of the LDC according to time as a negative slope corresponding to the second slope.

8. A device for controlling an output of a low voltage direct current-direct current (DC-DC) converter (LDC) in an environmentally friendly vehicle, comprising:
an auxiliary battery configured to supply power to an electric load using a high voltage battery used for driving the environmentally-friendly vehicle, wherein the LDC is configured to charge and discharge the auxiliary battery; and
a controller configured to transmit a first slope signal to the LDC to increase an output voltage of the LDC when the environmentally friendly vehicle is traveling in a regenerative braking mode, wherein the first slope signal determines an upward slope of the output voltage of the LDC according to time as a first slope,
wherein when the environmentally friendly vehicle is not traveling in the regenerative braking mode and uses a high power electric load included in the electric load, the controller is configured to transmit a second slope signal to the LDC to increase the output voltage of the LDC, and
wherein the second slope signal determines the upward slope as the second slope having a slope less than the first slope.

9. The device of claim 8, wherein the controller is configured to transmit the first slope signal to the LDC when a state of charge (SOC) of the auxiliary battery exceeds the first threshold value, and transmit the second slope signal to the LDC when the SOC of the auxiliary battery is less than the first threshold value.

10. The device of claim 8, wherein the controller is configured to transmit the first slope signal to the LDC when a current of the electric load is less than a second threshold value, and transmit the second slope signal to the LDC when the current of the electric load is greater than the second threshold value.

11. The device of claim 8, wherein the controller is configured to transmit the first slope signal to the LDC when a voltage difference between a first voltage of the auxiliary battery measured at a first particular time and a second voltage of the auxiliary battery measured at a second particular time after a predetermined time elapses after the first particular time is not zero, and the controller is configured to transmit the second slope signal to the LDC when the voltage difference is zero.

12. The device of claim 8, wherein the controller is configured to maintain the output voltage of the LDC increased according to the transmitted first slope signal when a current of the auxiliary battery is less than a third threshold value, and transmit the second slope signal to the LDC when the current of the auxiliary battery is greater than the third threshold value.

13. The device of claim 8, wherein when the environmentally friendly vehicle is not traveling in the regenerative braking mode, the controller is configured to transmit a third slope signal to the LDC to reduce the output voltage of the LDC, and wherein the third slope signal determines a downward slope of the output voltage of the LDC according to time as a third slope greater than the downward slope corresponding to the second slope.

14. The device of claim 8, wherein when the environmentally friendly vehicle is not traveling in the regenerative braking mode, the controller is configured to transmit a slope signal to the LDC to reduce the output voltage of the LDC, and wherein the slope signal determines a downward slope of the output voltage of the LDC according to time as a negative slope corresponding to the second slope.

\* \* \* \* \*